US011327600B2

(12) United States Patent
Nakamura (10) Patent No.: US 11,327,600 B2
(45) Date of Patent: May 10, 2022

(54) ELECTRONIC DEVICE AND COMMUNICATION DEVICE FOR REGISTERING REGISTERED DATA AND NAME OF REGISTERED DATA THAT CAN BE READ BY NUMBER DESIGNATION OF USER IN ASSOCIATION WITH ONE-TOUCH KEY

(71) Applicant: KYOCERA Document Solutions Inc., Osaka (JP)

(72) Inventor: Shigeaki Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/165,423

(22) Filed: Feb. 2, 2021

(65) Prior Publication Data
US 2021/0240295 A1    Aug. 5, 2021

(30) Foreign Application Priority Data

Feb. 4, 2020    (JP) .............................. JP2020-017394

(51) Int. Cl.
*G06F 3/041*    (2006.01)
*G06F 3/14*     (2006.01)

(52) U.S. Cl.
CPC .............. *G06F 3/0416* (2013.01); *G06F 3/14* (2013.01)

(58) Field of Classification Search
CPC ................................. G06F 3/0416; G06F 3/14
See application file for complete search history.

(56) References Cited

U.S. PATENT DOCUMENTS

| 2003/0179871 | A1* | 9/2003 | Ito ............ G06Q 10/10 379/93.24 |
| 2010/0149589 | A1* | 6/2010 | Hayashi ....... H04N 1/00474 358/1.15 |
| 2010/0241995 | A1* | 9/2010 | Kojima ........ G06Q 10/10 715/840 |
| 2011/0063310 | A1* | 3/2011 | Iwade ........ G09G 5/363 345/522 |
| 2013/0286435 | A1* | 10/2013 | Anezaki ....... H04N 1/00503 358/1.15 |
| 2018/0365034 | A1* | 12/2018 | Becotte, IV ...... G06F 9/44521 |

FOREIGN PATENT DOCUMENTS

JP    2010-226386 A    10/2010

* cited by examiner

*Primary Examiner* — Ryan A Lubit
(74) *Attorney, Agent, or Firm* — IP Business Solutions, LLC (57) ABSTRACT

In an electronic device, a storage device registers registered data and a name of the registered data in association with a number of a one-touch key. A control device functions as a detector, a controller, and a releaser. When an operation device receives a request for registration of new registered data, the detector detects the number of the one-touch key satisfying a release condition. The controller displays the number of the one-touch key satisfying the condition in association with the name of the registered data corresponding to the number on a display device. The releaser registers data corresponding to a selected number of a one-touch key among numbers of one-touch keys satisfying the condition and a name of the registered data, in association with an unregistered number of a one-touch key, and releases a one-touch key having a number assigned to the registered data and the name of the data.

8 Claims, 7 Drawing Sheets

Fig.2

| NUMBER OF ONE-TOUCH KEY | REGISTERED NAME | DESTINATION | LAST USE DATE |
|---|---|---|---|
| 0001 | AAA | 11-1111-1111 | 2019/12/01 |
| 0002 | BBB | 22-2222-2222 | 2019/05/05 |
| 0003 | CCC | 33-3333-3333 | 2019/12/03 |
| 0004 | DDD | 44-4444-4444 | 2019/12/04 |
| 0005 | EEE | 55-5555-5555 | 2019/02/02 |
| 0006 | FFF | 66-6666-6666 | 2019/12/06 |
| 0007 | GGG | 77-7777-7777 | 2019/07/07 |
| 0008 | HHH | 88-8888-8888 | 2019/08/08 |
| 0009 | III | 99-9999-9999 | 2019/09/09 |
| 0010 | JJJ | 10-0010-0010 | 2019/10/10 |
| 0011 | KKK | 11-0011-0011 | 2019/11/11 |
| 0012 | LLL | 12-0012-0012 | 2019/12/12 |
| 0013 | MMM | 13-0013-0013 | 2019/11/01 |
| 0014 | NNN | 14-0014-0014 | 2019/03/03 |
| 0015 | OOO | 15-0015-0015 | 2019/11/03 |
| 0016 | PPP | 16-0016-0016 | 2019/11/04 |
| 0017 | QQQ | 17-0017-0017 | 2019/11/05 |
| 0018 | RRR | 18-0018-0018 | 2019/11/06 |
| 0019 | SSS | 19-0019-0019 | 2019/11/07 |
| 0020 | TTT | 20-0020-0020 | 2019/11/08 |
| 0021 | UUU | 21-0021-0021 | 2019/11/09 |
| 0022 | VVV | 22-0022-0022 | 2019/11/10 |
| ... | ... | ... | ... |
| 0152 | YYYYY | 30-0030-0030 | 2019/12/10 |
| 0153 | ZZZZZZ | 31-0031-0031 | 2019/12/11 |

ELECTRONIC DEVICE AND COMMUNICATION DEVICE FOR REGISTERING REGISTERED DATA AND NAME OF REGISTERED DATA THAT CAN BE READ BY NUMBER DESIGNATION OF USER IN ASSOCIATION WITH ONE-TOUCH KEY

INCORPORATION BY REFERENCE

This application claims priority to Japanese Patent Application No. 2020-017394 filed on 4 Feb. 2020, the entire contents of which are incorporated by reference herein.

BACKGROUND

This disclosure relates to an electronic device and a communication device, and more particularly, to registration of data such as destinations to one-touch keys.

In a communication device (for example, a facsimile device), a technology for registering destinations (for example, dial information) in association with numbers of one-touch keys and automatically reading the destination registered in association with a number designated by an operation when a one-touch key is operated is generally known. With this technology, an operating procedure is simplified and operability is improved.

SUMMARY

As an aspect of the present disclosure, a technology that is a further improvement of the above technology is proposed.

An electronic device according to an aspect of the present disclosure includes a display device, an operation device, a storage device, and a control device.

The operation device receives an instruction on the basis of an operation of a user. The storage device registers registered data and a name of the registered data that are able to be read by a number designation of the user in association with a number of a one-touch key. The control device includes a processor, and functions as a detector, a controller, and a releaser by the processor executing a control program. The detector detects a number of a one-touch key satisfying a preset release condition when the operation device receives a request for registration of new registered data from the user. The controller displays the number of the one-touch key satisfying the release condition on the display device in association with the name of the registered data registered in association with the number on the basis of a detection result of the detector. The releaser registers registered data and a name of the registered data registered in the storage device in association with a number of a one-touch key selected by an operation of the user with respect to the operation device among the numbers of one-touch keys satisfying the release condition displayed on the display device, in association with an unregistered number of a one-touch key of which registered data and a name of the registered data are not registered, and releases a one-touch key having a number assigned until then to the registered data and the name of the registered data such that new registered data and a name of the registered data are able to be registered in association with the number of the one-touch key.

A communication device according to another aspect of the present disclosure includes the electronic device and a communicator device. The communicator performs communication with an external device. The registered data stored in the storage device is data indicating a destination to which transmission target data is transmitted. The controller reads the registered data registered in association with the number of the one-touch key designated by a user from the storage device, and transmits the transmission target data to the destination indicated by the registered data via the communicator on the basis of the read registered data.

DETAILED DESCRIPTION

Figure 1:
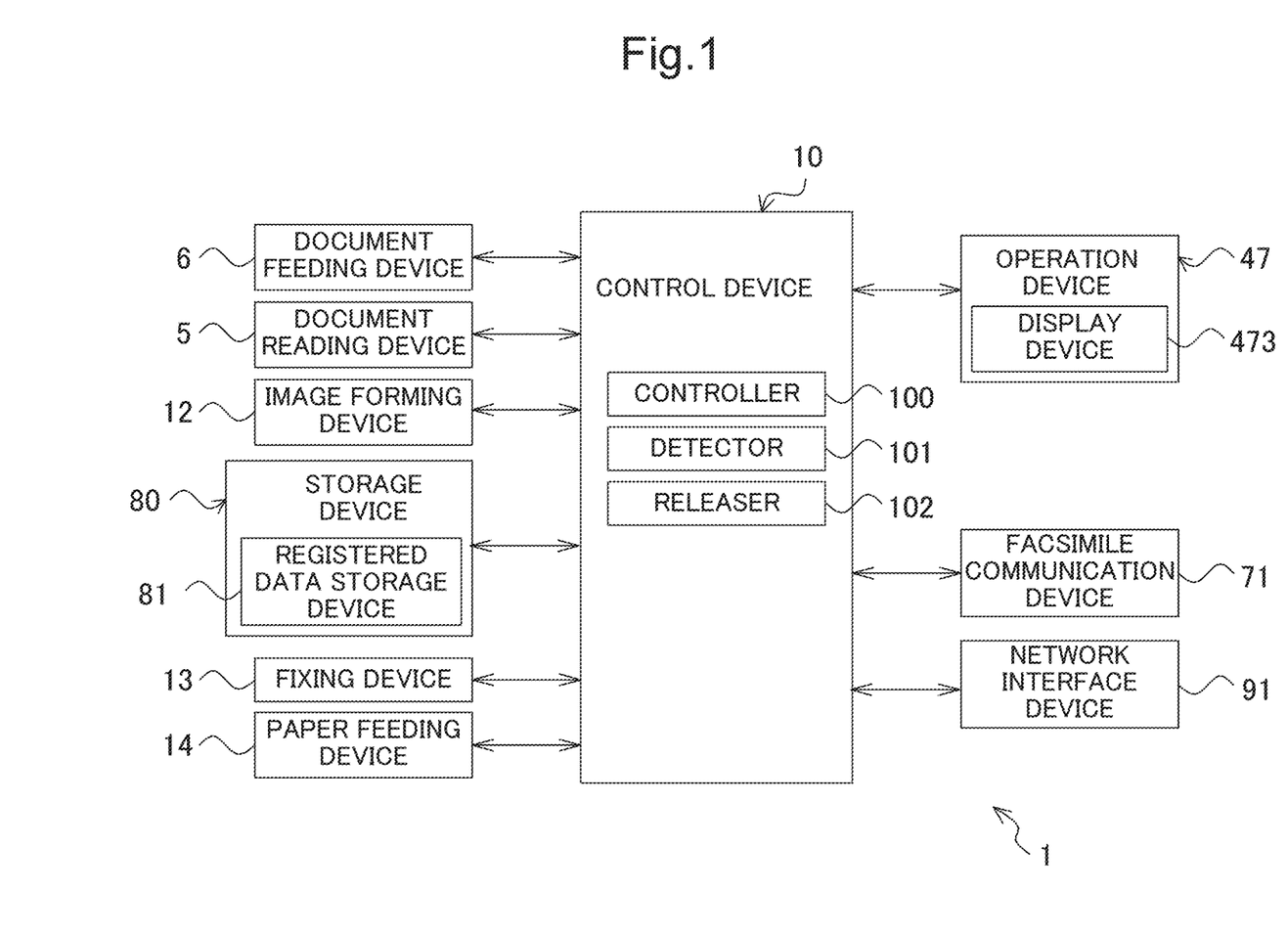
FIG. 1 is a functional block diagram schematically illustrating a main internal configuration of a communication device serving as an electronic device according to a first embodiment of the present disclosure.

Hereinafter, an electronic device and a communication device according to embodiments of the present disclosure will be described with reference to the drawings. FIG. 1 is a functional block diagram schematically illustrating a main internal configuration of a communication device serving as an electronic device according to a first embodiment of the present disclosure.

The electronic device according to the first embodiment is, for example, a communication device 1. The communication device 1 is a multifunction device having a plurality of functions such as a copy function, a printer function, a scanner function, and a facsimile function. The communication device 1 includes a control device 10, a document feeding device 6, a document reading device 5, an image forming device 12, a storage device 80, a fixing device 13, a paper feeding device 14, an operation device 47, a facsimile communicator 71, and a network interface device 91.

A case in which the document reading operation is performed by the communication device 1 will be described. The document reading device 5 optically reads an image of a document supplied to the document reading device 5 by the document feeding device 6 or a document placed on a contact glass, and generates image data. The image data generated by the document reading device 5 is stored in an image memory or the like.

A case in which an image formation operation is performed by the communication device 1 will be described. The image forming device 12 forms a toner image on recording paper serving as a recording medium fed from the paper feeding device 14 to perform printing on the basis of the image data generated in the document reading operation, the image data stored in the image memory or the like, image data received from a computer serving as an external device connected to the network, or the like.

The storage device 80 is a hard disk drive (HDD), a solid state drive (SSD), or the like, stores various control programs and the like, and includes a registered data storage device 81. The registered data storage device 81 registers registered data that can be read by designation of a number from the user and a name of the registered data in association with the number of a one-touch key.

Figure 2:
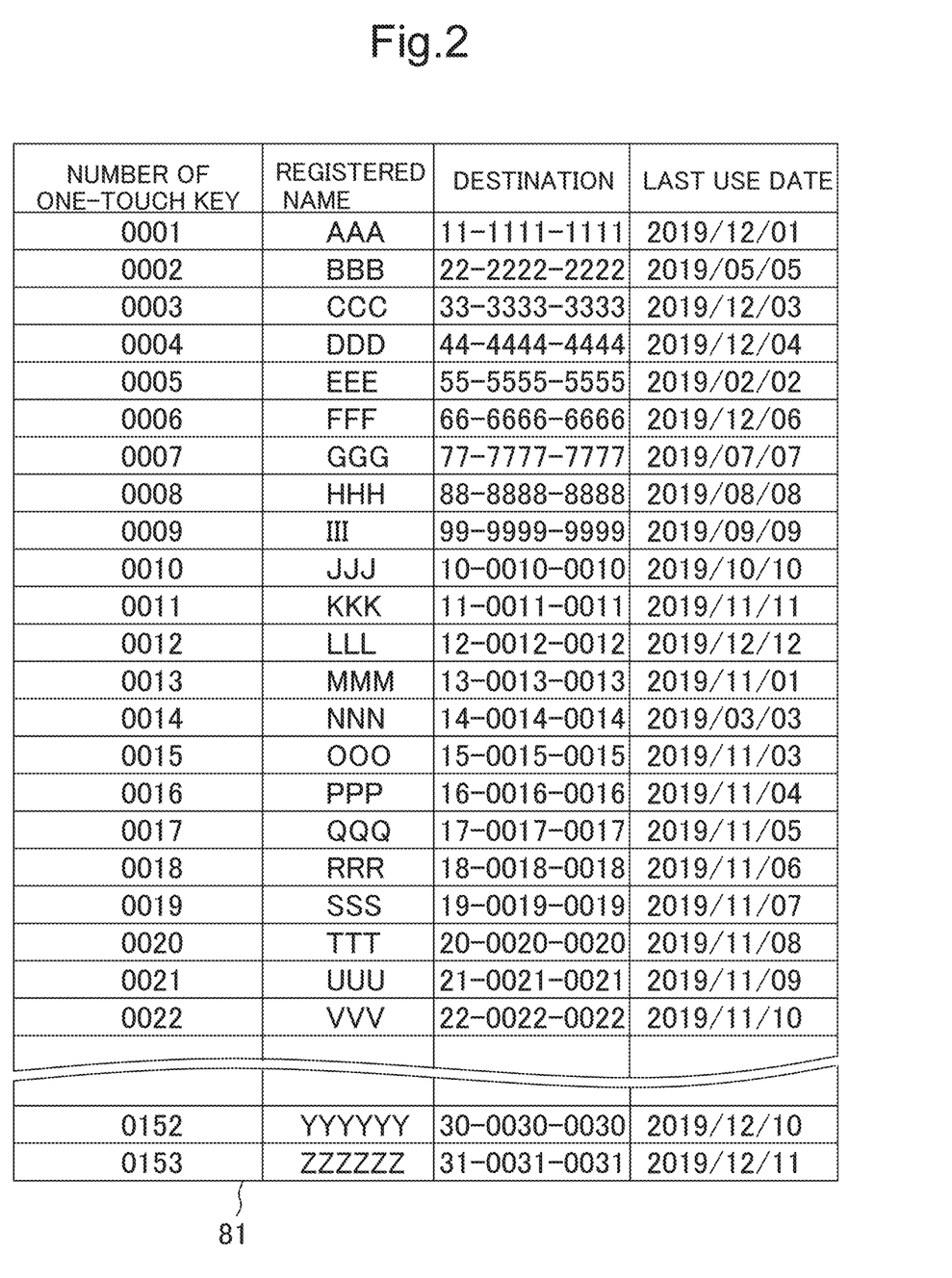
FIG. 2 is a diagram illustrating an example of a data structure of a registered data storage device.

FIG. 2 illustrates an example of a data structure stored in the registered data storage device 81. The registered data storage device 81 stores the name of the registered data (registered name), the registered data (data indicating a destination, including dial information or the like.), and a date of use on which the one-touch key having the number was used last (last use date) in association with the number of the one-touch key.

The "last use date" is updated by a controller 100 that will be described below. When a one-touch key is used, the controller 100 acquires current date and time information from a clock built into the control device 10 and updates "last use date" of the one-touch key having a corresponding number.

The fixing device 13 heats and pressurizes the recording paper on which the toner image is formed by the image forming device 12 to fix the toner image on the recording paper. The recording paper having been subjected to a fixing process is discharged to a discharge tray. The paper feeding device 14 includes a paper feeding cassette.

The operation device 47 receives an instruction such as an image formation operation execution instruction from the user with respect to various operations and processes that can be executed by the communication device 1. The operation device 47 includes a display device 473 that displays operation guidance and the like for the user. The operation device 47 receives an input of an instruction based on an operation (a touch operation) of the user with respect to an operation screen displayed on the display device 473 via a touch panel included in the display device 473.

The display device 473 is a display including a liquid crystal display (LCD) or the like. The display device 473 includes the touch panel. When the user touches a button or key displayed on the screen, the touch panel receives an instruction associated with a touch position.

The facsimile communicator 71 includes a coding, decoding, modulation and demodulation device, and a network control unit (NCU), and performs transmission and reception of a facsimile using a public telephone network or the like. The facsimile communicator 71 is an example of a communication device within the scope of claims.

The network interface device 91 is a communication interface that performs transmission and reception of various pieces of data to and from an external device (for example, a personal computer) in a local area or on the Internet.

The control device 10 includes a processor, a random access memory (RAM), a read only memory (ROM), and a dedicated hardware circuit. The processor is, for example, a central processing unit (CPU), an application specific integrated circuit (ASIC), a micro processing unit (MPU), or the like.

The control device 10 functions as a controller 100, a detector 101, and a releaser 102 through an operation of the processor according to a control program stored in the storage device 80. However, the controller 100 and the like can be configured of hardware circuits regardless of an operation according to the control program by the control device 10. Hereinafter, the same applies to each embodiment unless otherwise specified.

The controller 100 controls overall operation control of the communication device 1. The controller 100 is connected to the document feeding device 6, the document reading device 5, the image forming device 12, the storage device 80, the fixing device 13, the paper feeding device 14, the operation device 47, the facsimile communicator 71, and the network interface device 91, and performs, for example, drive control of each of the devices.

Figure 3:
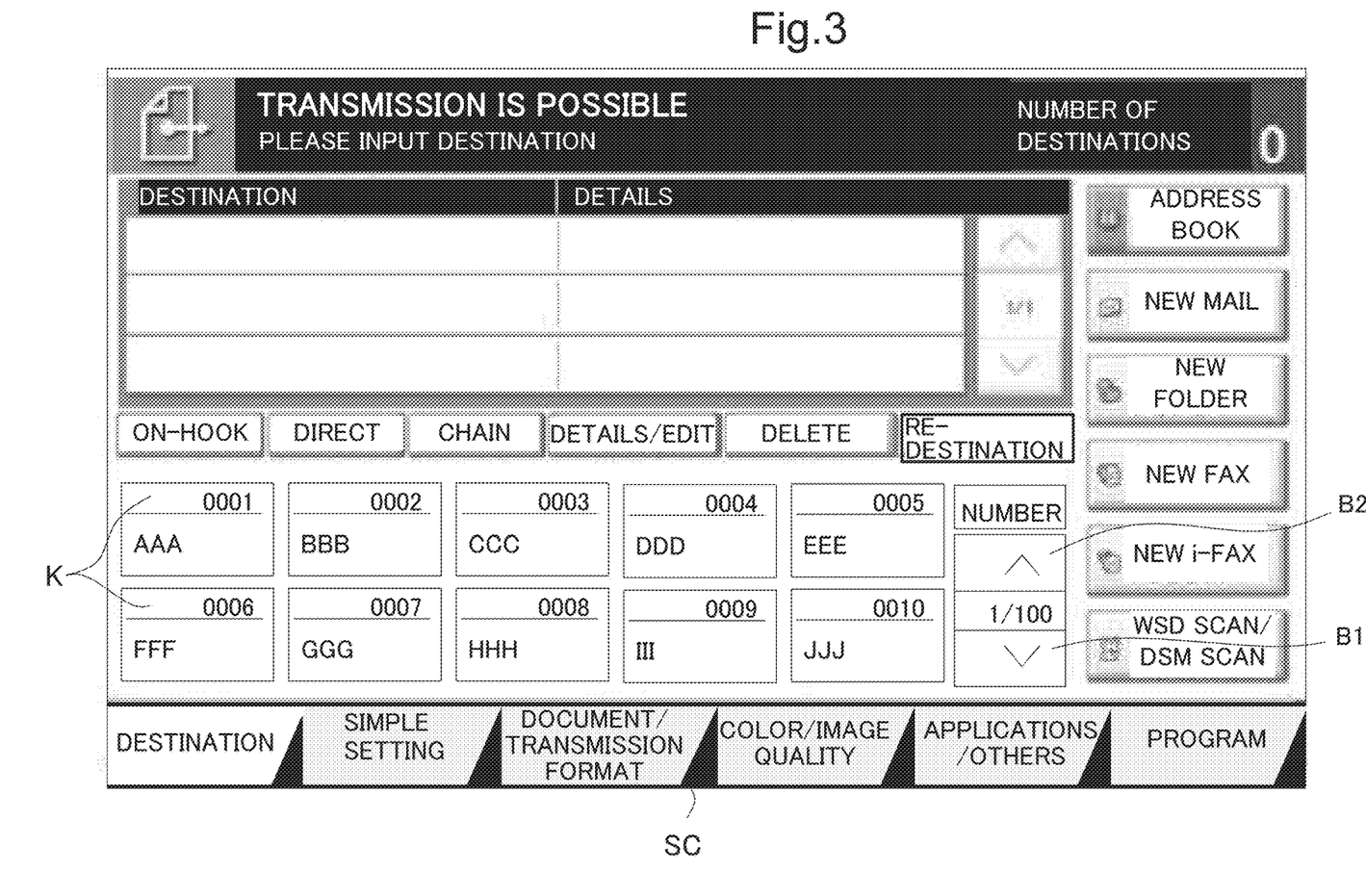
FIG. 3 is a diagram illustrating an example of an operation screen displayed on a display device.

For example, when the operation device 47 receives an instruction to perform facsimile transmission, the controller 100 displays an operation screen SC as illustrated in FIG. 3 on the display device 473. The operation screen SC is a basic operation screen in facsimile transmission. A total of 10 one-touch keys K (having numbers "0001 to 0010") in 2 columns and 5 rows are displayed on the operation screen SC.

The controller 100 does not include some of the plurality of one-touch keys K in a first screen, but includes some of the plurality of one-touch keys K in a second screen that is displayed next instead of the first screen (hereinafter, displaying the plurality of one-touch keys on a plurality of different screens is called "hierarchization," and a relationship of a display order of respective screens that are displayed sequentially like the first screen and the second screen is called a "layer"). The controller 100 displays the operation screen SC configured in this way on the display device 473, and switches a display of the one-touch key K to a screen on a layer directly below (a screen displayed next after a screen displayed at this point in time) when the user operates a page feed button B1 disposed on the right side of the one-touch key K and the operation device 47 receives an instruction to switch the display of the one-touch key K associated with the page feed button B1 to the directly lower layer. The controller 100 switches the display of the one-touch key K to a screen on a layer directly above when the user operates a page return button B2 arranged on the right side of the one-touch key K and the operation device 47 receives an instruction to switch the display of the one-touch key K associated with the page return button B2 to the layer directly above.

For example, when the page feed button B1 is operated by the user while the one-touch keys K having numbers "0001 to 0010" are displayed under the control of the controller 100, the controller 100 displays the one-touch keys K having the numbers "0011 to 0020" on the operation screen SC, and the controller 100 displays the one-touch keys K having the numbers "0001 to 0010" on the operation screen SC when the page return button B2 is operated by the user while the one-touch keys K having the numbers "0011 to 0020" are displayed.

When the operation device 47 receives a number designation for a one-touch key K by the user, the controller 100 reads the registered data (destination) registered in association with the number of the one-touch key K designated by the user from the registered data storage device 81.

When the operation device 47 receives a "start" instruction for the facsimile transmission, the controller 100 transmits transmission target data (for example, image data obtained through reading by the document reading device 5) to the destination indicated by the registered data via the facsimile communicator 71 on the basis of the read registered data.

The detector 101 detects a number of a one-touch key satisfying a preset release condition when the operation device 47 receives a request for registration of new registered data from the user. The release condition is, for example, a condition that a preset period (for example, 180 days) has elapsed since a last use. This period can be freely set by the user via the operation device 47. "Release" refers to eliminating an association of a one-touch key having a number assigned until then to certain registered data and a name of the registered data with the registered data and the name to enable new registered data and a name of the registered data to be registered in the one-touch key.

Figure 4:
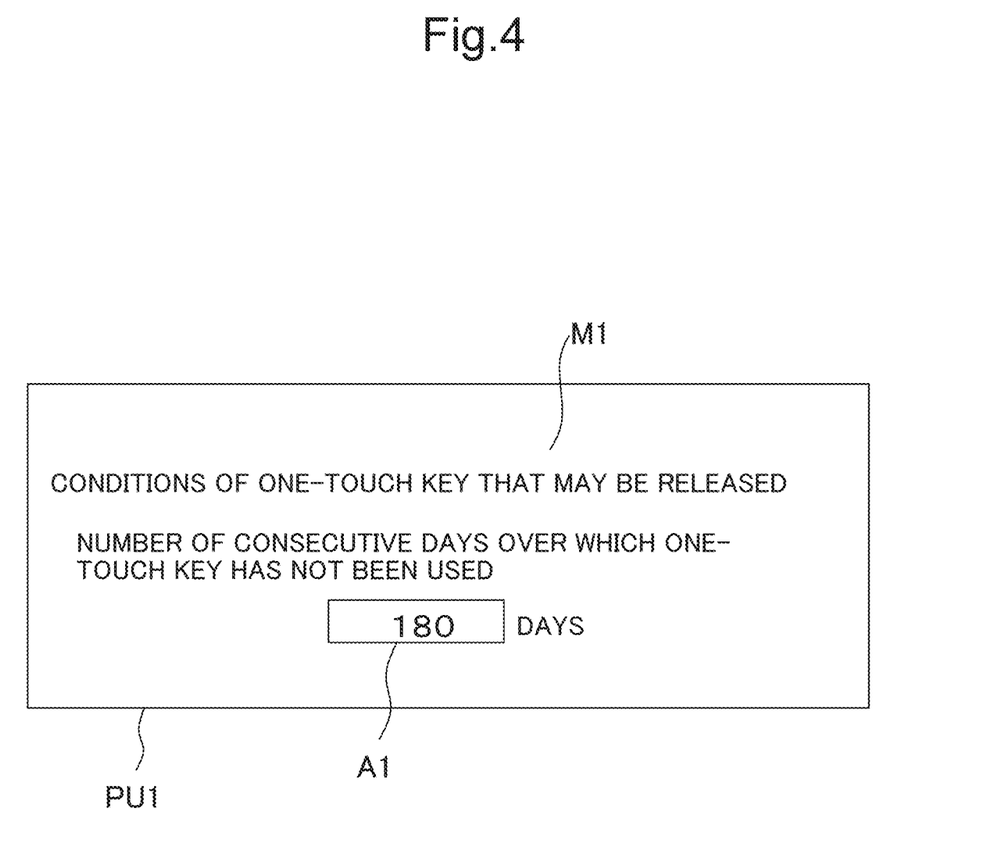
FIG. 4 is a diagram illustrating an example of a pop-up screen displayed on the display device.

FIG. 4 is a diagram illustrating an example of a pop-up screen displayed on the display device 473 by the controller 100 when a setting of the above period is received. A message M1 "Conditions for one-touch key that may be released" is displayed, on a pop-up screen PU1 and an input area A1 allowing the user to input the condition "The number of consecutive days over which a one-touch key has not been used" is displayed.

Figure 5:
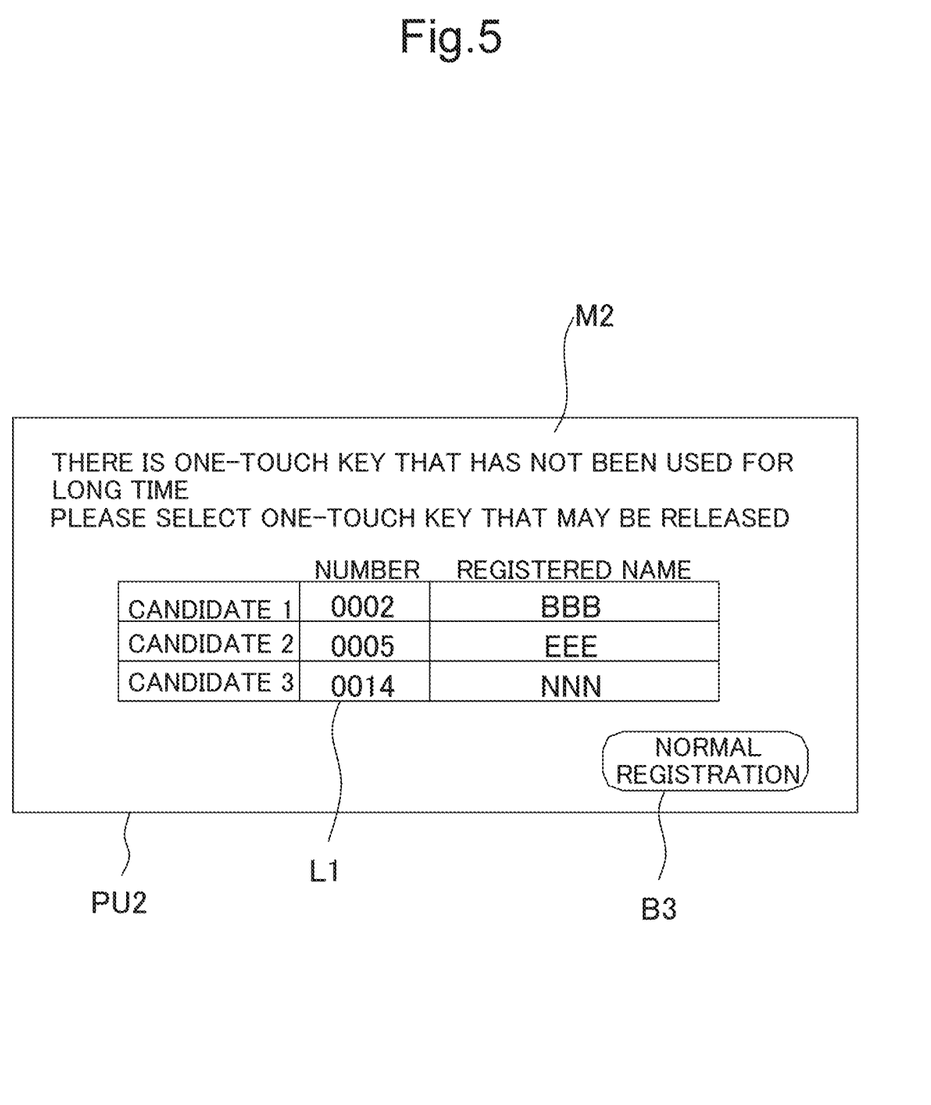
FIG. 5 is a diagram illustrating another example of the pop-up screen displayed on the display device.

FIG. 5 is a diagram illustrating an example of a pop-up screen PU2 on which numbers of one-touch keys satisfying the above release condition are displayed. The controller 100 displays the numbers of one-touch keys satisfying the above release condition on the display device 473 in association with the names (registered names) of the registered data registered in association with the numbers on the basis of a detection result of the detector 101. For example, the controller 100 displays these on the pop-up screen PU2. When the controller 100 displays a plurality of numbers of one-touch keys satisfying the above release condition, the controller 100 arranges and displays the one-touch key having a smaller number first (for example, on the upper side in FIG. 5).

The controller 100 displays a message M2 "There is a one-touch key that has not been used for a long time. Please select a one-touch key that may be released," a release candidate list L1, and a selection button B3 marked as "normal registration" on the pop-up screen PU2. The release candidate list L1 is a list showing numbers of one-touch keys satisfying the release condition in association with a name (registered name) of registered data registered in association with the number.

For example, when the user requests registration of new registered data on Dec. 13, 2019, one-touch keys having numbers "0002," "0005," and "0014" are one-touch keys in which 180 days have passed since the last use on the basis of "last use date" stored in the registered data storage device 81 (FIG. 2) and thus, these numbers "0002," "0005," and "0014" are displayed in order from top in the release candidate list L1, as illustrated in FIG. 5. Further, since the smaller number is displayed first, the smallest number is displayed on the upper side of the release candidate list L1.

The releaser 102 registers registered data and a name of the registered data (registered information) registered in association with a number of a one-touch key selected by an operation of the user with respect to the operation device 47 among the numbers of one-touch keys (the numbers listed in the release candidate list L1) satisfying the above release condition displayed on the display device 473, in association with unregistered numbers of one-touch keys of which registered data and a name of the registered data are not registered, and releases the one-touch key having the number assigned until then to the registered data and the name of the registered data such that new registered data and a name of the registered data can be registered, thereby setting an unregistered state.

It is preferable for the releaser 102 to register the registered information in association with the smallest number among the unregistered numbers of one-touch keys. As illustrated in FIG. 2, when information is registered in the registered data storage device 81, the smallest number among the unregistered numbers of one-touch keys is "0154".

For example, when the user selects "candidate 2" from among the numbers listed in the release candidate list L1, the releaser 102 registers information registered in association with a number "0005" of a one-touch key (registered data "55-5555-5555" and a name "EEE") in a unregistered number "0154" of a one-touch key, deletes information registered until then in association with the number of the one-touch key "0005," and returns a one-touch key having the number "0005" to an unregistered state. That is, the registered data "55-5555-5555" and the name "EEE" are not deleted, but are moved from the number of the one-touch key "0005" to the number "0154". Accordingly, the number "0005" becomes an empty number, and new registration can be freely performed.

Next, a first embodiment of a process of the communication device 1 will be described on the basis of a flowchart illustrated in FIG. 6. This process is a process that is performed when the operation device 47 receives a request for "one-touch key registration" from the user.

The detector 101 searches for the number of the one-touch key satisfying the above release condition on the basis of the "last use date" stored in the registered data storage device 81 (step S1). The controller 100 determines whether or not a one-touch key satisfying the above release condition has been detected by the detector 101 (step S2).

When the controller 100 determines that a one-touch key satisfying the release condition has been detected by the detector 101 (YES in step S2), the controller 100 displays the pop-up screen PU2 having the release candidate list L1 in which the numbers of the one-touch keys satisfying the release condition are listed on the display device 473, as illustrated in FIG. 5, on the basis of the detection result of the detector 101 (step S3).

The controller 100 determines whether or not any one of the numbers of one-touch keys listed in the release candidate list L1 has been selected by an operation of the user with respect to the operation device 47 (step S4). When the controller 100 determines that any one of the numbers of one-touch keys listed in the release candidate list L1 has been selected by the operation of the user with respect to the operation device 47 (YES in step S4), the releaser 102 registers the registered information registered in association with a number of a one-touch key selected by the user, in association with the smallest number among the unregistered numbers of one-touch keys (step S5). Accordingly, the association of the number of a one-touch key selected by the user with the registered information registered until then is deleted, and the one-touch key is released.

Thereafter, the controller 100 registers a new registered data and a name of the new registered data in the registered data storage device 81 in association with the number of the one-touch key released by the releaser 102 according to an instruction input by the operation of the user with respect to the operation device 47 (step S6). The process then ends.

On the other hand, when the controller 100 determines that none of the numbers of one-touch keys listed in the release candidate list L1 has been selected by the user (specifically, the operation device 47 receives a user operation of the selection button B3 marked as "normal registration") (NO in step S4), the controller 100 registers the new registered data and the name of the new registered data in the registered data storage device 81 in association with the unregistered number of the one-touch key according to the instruction input by the operation of the user with respect to the operation device 47 as usual (step S8). The process then ends.

Further, even when the controller 100 determines in step S2 that a one-touch key satisfying the above release condition has not been detected by the detector 101 (NO in step S2), the controller 100 registers the new registered data and the name of the new registered data in the registered data storage device 81 in association with the unregistered number of the one-touch key according to the instruction input by the operation of the user with respect to the operation device 47 as usual (step S8). The process then ends.

Incidentally, when there are plurality of one-touch keys, the number of one-touch keys that can be displayed on the same operation screen is limited, and thus, some of the plurality of one-touch keys are not displayed on an initial screen and are displayed later by scrolling. Further, it is common for a one-touch key having the smaller number to be displayed preferentially. Therefore, when the maximum number of one-touch keys that can be displayed on the same operation screen is 10, one-touch keys corresponding to numbers "0001 to 0010", for example, are displayed on an uppermost layer, and the one-touch keys corresponding to the numbers "0011 to 0020" are displayed on a second screen that is displayed later by scrolling.

As a matter of course, since a one-touch key (one-touch key having a small number) that is displayed on the first screen has fewer operation procedures required for selection than a one-touch key (one-touch key having a large number) that is displayed on the second screen, a one-touch key having a smaller number is preferred by users.

Therefore, when the number of pieces of data registered in a one-touch key increases, a one-touch key having a small number runs out of space, and new data has to be registered in a one-touch key having a larger number. Therefore, newly registered data takes more time to read than previously registered data.

However, previously registered data may be left as it is without being used for a long period of time. That is, data having little utility value (data left as it is) occupies one-touch keys having smaller numbers (one-touch keys that require fewer operation procedures). This is very poor for operability and is not preferable.

In the general technology described above, a technology for automatically registering a destination in a destination book and a technology for automatically deleting an infrequently used destination from a destination book among automatically registered destinations are known, but it is rather inconvenient to automatically delete information just because information is infrequently used. Further, in the general technology described above, targets of the deletion are only the automatically registered destinations, and manually registered destinations are not included.

On the other hand, according to the first embodiment, information registered in association with a number of a one-touch key (one-touch key of which data was registered long ago and that is highly likely to have a relatively small number) satisfying a preset release condition (for example, a condition that 180 days that are a preset period have passed since the last use) is registered in association with a number of an unregistered one-touch key (one-touch key highly likely to have a relatively large number), and a one-touch key having a number assigned until then (one-touch key highly likely to have a relatively small number) is released. In this case, the user can register new registered data in association with a number of a one-touch key to be released, through a simple operation only by selecting the number.

Thus, it is possible to release a one-touch key having a small number without increasing the burden on the user. Accordingly, it is possible to register new registered data in a one-touch key having a small number without increasing the burden on the user with the registered data registered until then left, and to improve operability of the one-touch key.

Figure 6:
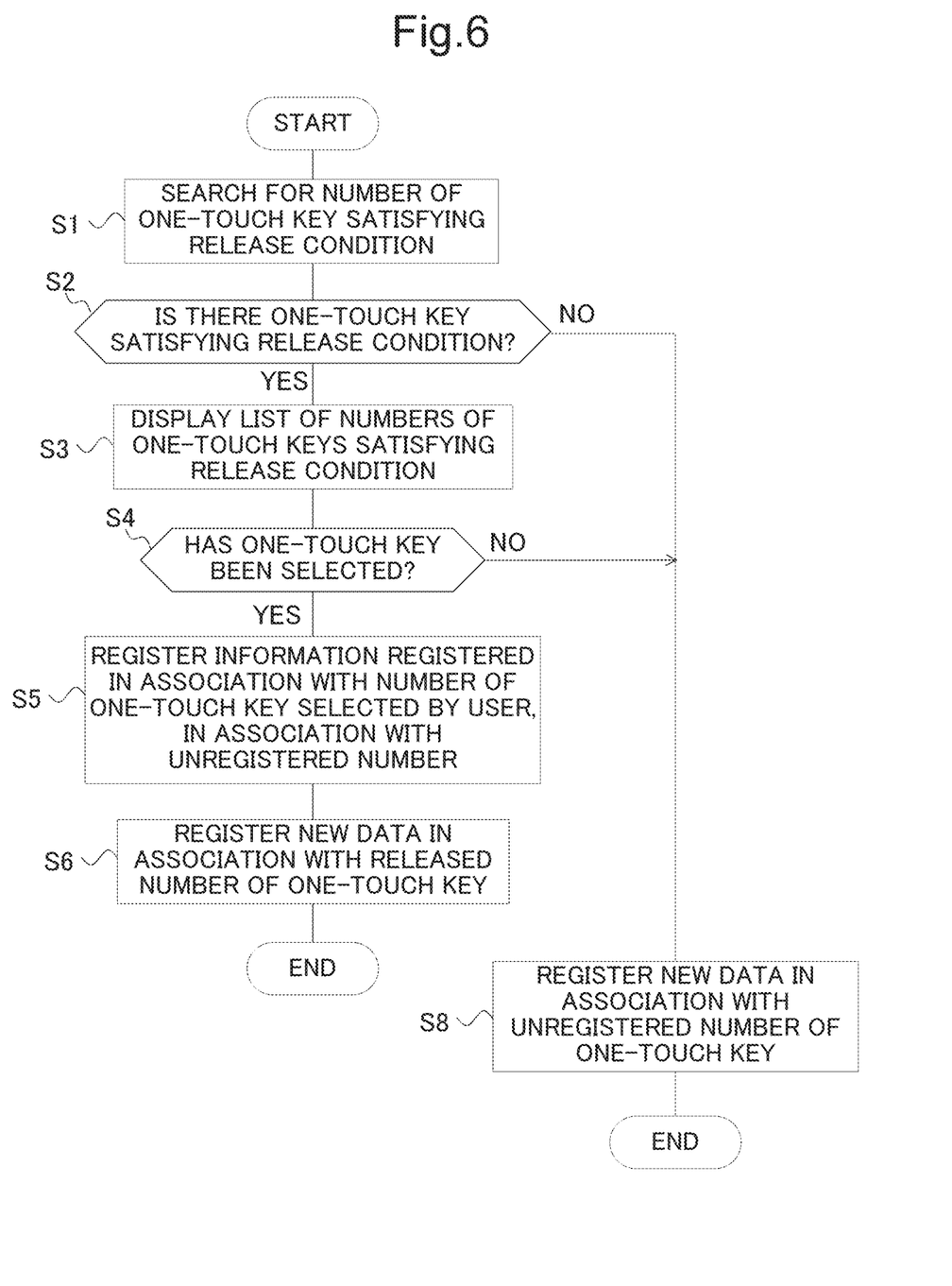
FIG. 6 is a flowchart illustrating a first embodiment of a process of a communication device.

Incidentally, when there are unregistered one-touch keys having the numbers "0001 to 0010" that are displayed on the uppermost layer (an initial screen), the processes of steps S1 to S6 illustrated in FIG. 6 may not be performed and thus, the controller 100 in a modification example of the first embodiment may confirm a registration situation of the one-touch keys having the numbers "0001 to 0010" before performing the process of step S1, and perform the process of step S8 without performing the processes of steps S1 to S6 when there are unregistered one-touch keys having the numbers "0001 to 0010" that are displayed on the uppermost layer. In the modification example, the controller 100 also performs the processes of steps S1 to S8 when there are no unregistered one-touch keys having the numbers "0001 to 0010" that are displayed on the uppermost layer.

Further, in the first embodiment, when the controller 100 displays a plurality of numbers of one-touch keys satisfying the above release condition on the display device 473, the controller 100 arranges and displays the smaller number on the upper side of the release candidate list L1 in order to preferentially display the smaller number first, whereas, in a second embodiment, the controller 100 may arrange and display a number of a one-touch key having a longer period since the last use among the numbers of one-touch keys displayed on the same layer in the operation screen SC, on the upper side of the release candidate list, in order to preferentially display the number of the one-touch key having a longer period first regardless of the sizes of the numbers.

Figure 7:
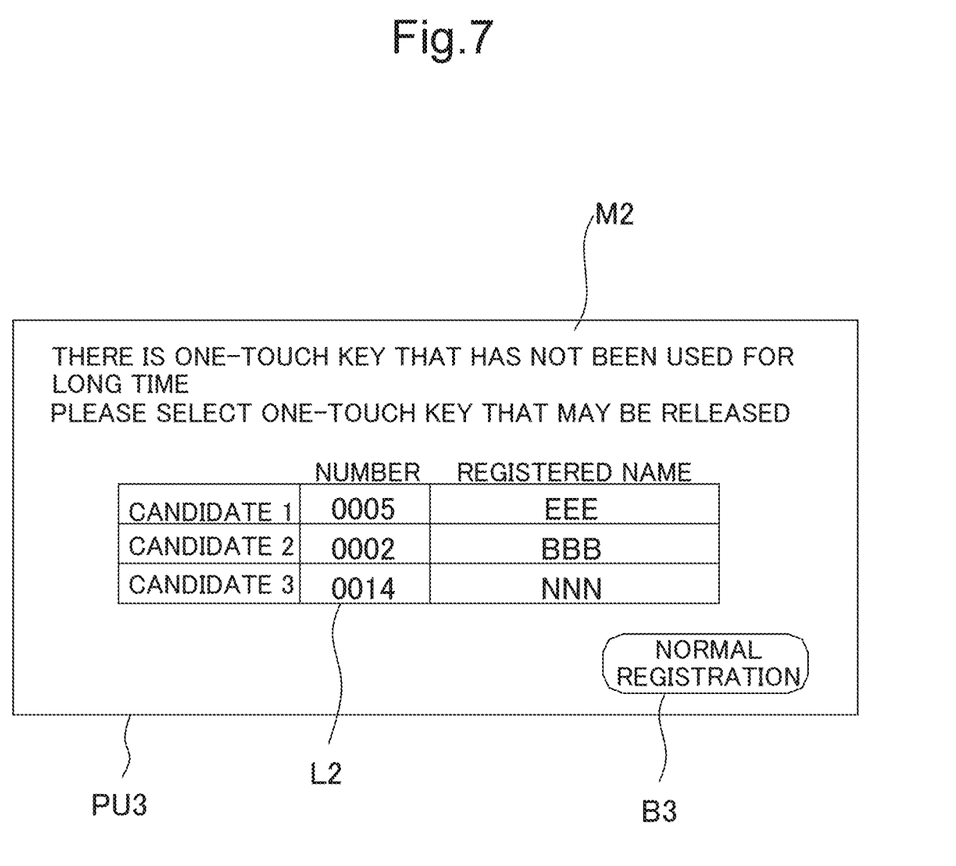
FIG. 7 is a diagram illustrating yet another example of the pop-up screen displayed on the display device.

The one-touch keys having the numbers "0002" and "0005" are displayed on the same layer (the same screen) on the operation screen SC as illustrated in FIG. 3. Further, the number "0005" has an older "last use date" and a longer period since the last use than the number "0002" as illustrated in FIG. 2. Accordingly, in the second embodiment, the controller 100 displays the number "0005" first in preference to the number "0002," and displays a pop-up screen PU3 having a release candidate list L2 in which the number "0005" is arranged and displayed above the number "0002" on the display device 473, as illustrated in FIG. 7.

Although information on "individual registration" has been described as an example of the registered data that is registered in the registered data storage device 81 in each of the above embodiments, the registered data is not limited thereto, and "group registration" that is collective registration of a plurality of "individual registrations" may be used for the registered data.

Further, an example of a communication device such as a facsimile device includes a device having a function of registering a transmission condition such as a transmission destination or a transmission time as a "program". Therefore, as yet another embodiment, the "program" may be registered as the registered data that is registered in the registered data storage device 81. Further, although facsimile transmission has been described in the embodiment, the transmission is not limited thereto and the embodiment can also be applied to data transmission to an external device (for example, a personal computer) via the network interface device 91.

The present disclosure is not limited to the configuration of the embodiment, and various modifications can be made. Further, in the embodiment, the electronic device according to the present disclosure has been described as the communication device 1 that is a multifunction device, but this is only an example and other electronic devices may be used. For example, other electronic devices having a communication function such as a facsimile function may be used.

Further, in the embodiment, the configurations and processes shown with reference to FIGS. 1 to 7 are merely an embodiment of the present disclosure, and the present disclosure is not intended to be limited to the configurations and processes.

While the present disclosure has been described in detail with reference to the embodiments thereof, it would be apparent to those skilled in the art the various changes and modifications may be made within the scope defined by the appended claims.

What is claimed is:

1. An electronic device comprising:
a display device;
an operation device configured to receive an instruction on the basis of an operation of a user;
a storage device configured to register first registered data and a first name of the first registered data that is able to be read by a number designation of the user, in association with a number of each of a plurality of first one-touch keys; and
a control device including a processor, and functioning as: by the processor executing a control program,
a detector that detects at least one number of a first one-touch key satisfying a preset release condition among numbers of the plurality of the first one-touch keys, when the operation device receives a request for registration of second registered data from the user;
a controller that displays the at least one number of the first one-touch key satisfying the release condition on the display device in association with the first name registered in association with the at least one number of the first one-touch key on the basis of a detection result of the detector, and
a releaser that registers, when the operation device receives a selection operation of the user for selecting a number of the first one-touch key among the at least one number of the first one-touch key satisfying the release condition displayed on the display device, the first registered data and the first name registered in the storage device in association with the number of the first one-touch key selected by the selection operation in association with a number of a second one-touch key of which the first registered data and the first name are not registered, and releases the first one-touch key having the selected number from the first registered data and the first name such that the second registered data and a second name of the second registered data are able to be registered in association with the selected number of the first one-touch key.

2. The electronic device according to claim 1, wherein the controller further registers the second registered data corresponding to a user designation received by the operation device in the storage device in association with the selected number of the first one-touch key released by the releaser.

3. The electronic device according to claim 1, wherein the releaser sets a condition that a preset period has passed since the last use as the release condition.

4. The electronic device according to claim 1, wherein the releaser registers the first registered data and the first name registered in association with the selected number of the first one-touch key selected by the selection operation of the user with respect to the operation device among the at least one number of the first one-touch key satisfying the release condition displayed on the display device, in association with a smallest number among the numbers of second one-touch keys.

5. The electronic device according to claim 1, wherein when the controller displays the at least one number of the first one-touch key satisfying the release condition on the display device, the controller displays a smallest number of the first one-touch key among the at least one number of the first one-touch key first.

6. The electronic device according to claim 5,
wherein the controller
displays an operation screen in which some of a plurality of one-touch keys are hierarchized on the display device, and
displays the at least one number of the first one-touch key having a longest period since last use among numbers of first one-touch keys displayed on the same layer in the operation screen first regardless of sizes of the numbers when the controller displays the at least one number of the first one-touch key satisfying the release condition on the display device.

7. The electronic device according to claim 1,
wherein the controller displays an operation screen in which some of a plurality of one-touch keys are hierarchized on the display device,
the detector does not detect the at least one number of the first one-touch key satisfying the release condition when there is the second one-touch key among the one-touch keys displayed on the operation screen, and
the controller registers the second registered data in the storage device in association with the number of the second one-touch key.

8. A communication device comprising:
the electronic device according to claim 1; and
a communicator configured to perform communication with an external device,
wherein the first or second registered data stored in the storage device is data indicating a destination to which transmission target data is transmitted, and
the controller reads the first or second registered data registered in association with the number of the first or second one-touch key designated by the user from the storage device, and transmits the transmission target data to the destination indicated by the first or second registered data via the communicator on the basis of the read first or second registered data.

* * * * *